United States Patent [19]
Bauer et al.

[11] Patent Number: 5,219,829
[45] Date of Patent: Jun. 15, 1993

[54] PROCESS AND APPARATUS FOR THE PREPARATION OF PULVERULENT METAL OXIDES FOR CERAMIC COMPOSITIONS

[75] Inventors: Gerd Bauer, Darmstadt; Matthias Kuntz, Muhltal; Ingrid Grobelsek; Dirk Reyermann, both of Darmstadt; Gunter Nimtz, Königsdorf, all of Fed. Rep. of Germany

[73] Assignee: Merck Patent Gesellschaft mit beschrankter Haftung, Darmstadt, Fed. Rep. of Germany

[21] Appl. No.: 787,332

[22] Filed: Nov. 4, 1991

[30] Foreign Application Priority Data

Nov. 2, 1990 [DE] Fed. Rep. of Germany ....... 4034786

[51] Int. Cl.$^5$ .................. C01B 13/18; C04B 38/04
[52] U.S. Cl. .................................. 505/1; 264/42; 423/593; 501/80; 501/84; 501/85; 505/737
[58] Field of Search ............... 505/1, 737, 739; 423/593; 264/42, 44; 501/80, 84, 85

[56] References Cited

U.S. PATENT DOCUMENTS

| | | | |
|---|---|---|---|
| 4,004,933 | 1/1977 | Ravault | 264/44 |
| 4,444,723 | 4/1984 | Matsumaru | 252/632 |
| 4,983,573 | 1/1991 | Bolt | 505/737 |
| 5,081,102 | 1/1992 | Gay | 505/737 |

Primary Examiner—Paul Lieberman
Assistant Examiner—John Boyd
Attorney, Agent, or Firm—Millen, White, Zelano & Branigan

[57] ABSTRACT

The invention relates to a process and an apparatus for converting metal nitrate or mixed metal nitrate solutions into the corresponding metal oxides in a microwave field. The invention consists in heating, while the feed stream is being metered in, in such a manner that the solvent always evaporates within seconds and the decomposition product is obtained as a porous, sponge-like, purely oxidic material, which can be ground easily to give a powder having particle sizes of 0.5 to about 10 μm. The controlled metering in of the nitrate solution simultaneously makes it possible to control the reaction temperature below the sintering temperature of the powder. The reaction of the nitrate starting solution can take place continuously/batchwise in a reaction flask or continuously in a rotating reaction pipe, which is preferably charged with grinding balls, which possibly exert a reaction-activating effect similar to that exerted very particularly by the metal oxide sponge formed during the reaction.

10 Claims, 3 Drawing Sheets

PROCESS AND APPARATUS FOR THE PREPARATION OF PULVERULENT METAL OXIDES FOR CERAMIC COMPOSITIONS

BACKGROUND OF THE INVENTION

The invention relates to a process for the preparation of pulverulent metal oxides for ceramic compositions from solutions of the corresponding metal nitrates by evaporation of the solvent (water or dilute nitric acid) and thermal decomposition of the metal nitrate or of mixtures of metal nitrates by means of microwaves. Furthermore, the invention relates to an apparatus for carrying out the process.

The main purpose of the invention is to prepare metal oxide powders, in particular to prepare pulverulent mixtures of oxides of various metals, for further processing to give ceramic compositions for, for example, varistors, piezoelectrics, ceramic superconductors, soft/hard ferrites, capacitors, microwave filters, ceramic sensors, such as oxygen partial-pressure sensors, and the like.

As is known, the performance characteristics of the ceramics mentioned depend not only on the homogeneity of the ceramic structure but also, in the case of mixed oxide ceramics, very significantly on the homogeneity of the metal oxide mixture for the preparation of the ceramic. This is why the use of highly homogeneous, very fine and sinter-active powders or powder mixtures is indispensable for preparing ceramic structural components of the type mentioned.

A plurality of processes for preparing ceramic mixed oxide powders is known, the most important of which will be briefly outlined below.

In the so-called mixed oxide process, dry metal oxides and/or carbonates are mixed in the desired ratio of the composition of the ceramic to be prepared, and, if desired, ground and then calcined in a crucible or in a rotary kiln at temperatures below the sintering temperature of the desired ceramic. In order to improve the sintering activity of the powders obtainable by the mixed oxide process, a vigorous grinding process is often required. During this process, material rubbed off from the grinding bodies reaches the powder material, which may result in a deterioration of the mechanical and electrical properties of the ceramics obtained from the powders. In order to improve the homogeneity of the powder grain and powder mixture, it is in some cases necessary to repeat the grinding and calcining process several times. Nevertheless, the desired high-performance properties of the oxidic powders can be achieved only in a few cases.

More recently, the attempt has been made to counter the basic disadvantages of the preparation of ceramic mixed oxide powders from pulverulent substances by preparing the oxide powders from solutions or suspensions, for which the reaction spraying process, coprecipitation, the sol/gel process and the preparation of oxides or mixed oxides in a microwave field are used. The initial forms of the substrates are here preferably metal nitrates and metal alkoxides.

In the reaction spraying process, the mixture of the dissolved components is sprayed into a hot reaction space, in which the solution droplets are dried and converted to oxide particles while still in the air. Since delivery of energy to the droplets or particles only takes place slowly and from the surface, hollow spheres are usually formed in the spraying process (E. Ivers-Tiffée, K. Seitz "Characterization of Varistortype, Raw Materials Prepared by the Evaporative Decomposition of Solution Technique", American Ceramic Bulletin 66 [9], pages 1384–1388 (1987)). When a ceramic is prepared from a powder comprising hollow spheres, some of these hollow spaces are exposed after sintering upon investigation of the structure. Ceramics with pores of this type have significantly lower strength compared with tight-burned ceramics.

In the coprecipitation process, the hydroxides of the initially introduced metal salts are precipitated from a mixed salt solution by increasing the pH, usually by adding ammonia, and the hydroxide mixtures are processed further to give the mixed oxide powder. The difficulties of the process are the complicated process control (after extensive empirical preliminary experiments) in order to achieve simultaneous precipitation of the hydroxides of the different metal cations. In many cases, additional measures must be taken for the coprecipitation process, in order to obtain a sufficiently homogeneous composition of the hydroxide mixture precipitate, for example the addition of certain anions.

In contrast, the sol/gel process is an elegant and, in terms of the desired product properties, satisfactory method. In this process, mixtures of metal alcoholates are preferably slowly hydrolysed and then subjected to a polycondensation process which converts the hydrolysate into a gel, which is then calcined to give the metal oxide powder. The advantages of the sol/gel process are, if the process of alcoholate hydrolysis and polycondensation is carried out with appropriate care, the homogeneous composition of the gel and the small particle size and sintering activity of the metal oxide powders obtainable from the gel. However, a particular disadvantage are the high production costs, determined in particular by the raw materials cost, of metal oxide powders obtained in this manner. An operative disadvantage worth mentioning is the low solids content of the starting solutions and the gels as a result of the complex organic molecular radicals.

Finally, the preparation of metal oxides or metal oxides or metal oxide mixtures from the corresponding metal nitrates by thermal decomposition by means of microwaves, which is also the starting point for the present invention, is known, DE 32 32 867, J84 009 487, J59 079 179, DE 33 46 253, J55 104 926, J56 145 104. However, the known processes are mostly limited essentially to the one-component system manganese (for the production of dry-cell anodes), to the preparation of mixed oxides for glass- or ceramic-reinforced composites or structural components and to the preparation of mixed oxides of uranium and thorium (for the production of nuclear fuel elements), for which one example each is given, but the first two of which do not start from dissolved but from solid metal nitrate.

According to Japanese Patent No. 067,946, solid manganese nitrate (150 g) is subjected to pulsing microwave irradiation (2.45 GHz, 600 W) for 12 minutes (in each case, 15 s of irradiation time with pauses inbetween of 10 s) and, after a pause of 25 minutes, again subjected to this pulsing microwave irradiation for 2 minutes. For further processing, the manganese dioxide obtained is finely ground in a ball mill.

According to German Offenlegungsschrift 36 11 141, which relates to a mixture for preparing fracture-resistant, fiber-reinforced ceramic material by microwave heating, a fiber-reinforced fracture-resistant ceramic material is obtained by the following principle: inorganic fibers ($SiC$; $Si_3N_4$), oxidic materials (glass; $Al_2O_3$; $ZrO_2$), a solid nitrate ($NaNO_3$; $Zr(NO_3)_4$) and a coupling agent (preferably glycerol) are mixed and subjected in a heat-resistant reaction vessel (diameter: 2.5 cm, height: 2cm) to microwave radiation (2.45 GHz) for 1 to 2 h, during which temperatures of around 1000° C. are reached. The melt produced leads to a fractureresistant ceramic article. The long duration of the microwave irradiation serves, inter alia, to obtain an ordered spatial orientation of the reinforcing fibers.

According to U.S. Pat. No. 4,444,723, the oxidic materials are produced from solutions of plutonium nitrate or uranyl nitrate or mixtures of these nitrates in a microwave field by heating the solution to 100° to 120° C., evaporating the solvent until a moist nitrate cake is obtained, heating the nitrate cake to 350° to 400° C. for converting the metal nitrate into the metal oxide and then calcining the metal oxide at 700° to 800° C. The reaction set-up essentially comprises a circulating continuous belt carrying a plurality of open and rotating reaction dishes which pass through at least three microwave chambers arranged one after the other, in which the nitrate solution is first evaporated, the nitrate cake obtained, after a steep increase in temperature with constant temperature control and adjustment, is then denitrated to give the metal oxide and finally the metal oxide obtained is calcined to give the process product upon passing through a plurality of microwave chambers, likewise with constant temperature measurement and adjustment. The temperature of the irradiated material is adjusted by mechanical vertical movements of the reaction dishes moving horizontally and rotating on the continuous belt in the microwave field.

Although the conversion of metal nitrates to metal oxides in the microwave field is in principle known, the known processes cannot be utilised for preparing, in particular, mixed oxide powders for high-performance ceramics. Some of the reasons are as follows:

When starting from dry mixtures of the nitrates, fundamental disadvantages similar to those of the mixed oxide process described above have to be accepted. A further disadvantage, which can be derived from U.S. Pat. No. 4,444,723, is that nitrate materials initially introduced in dry form or obtained by evaporating a nitrate solution, after reaching a higher temperature and thus enhanced coupling properties with microwaves, have the tendency often to heat up rapidly and with glowing in an uncontrollable manner, which may lead to rapid sintering of the material. Owing to the regular inhomogeneities of the microwave field, possibly also owing to other causes, the glowing is often only limited locally. If the reaction is interrupted by switching off the microwave field and then continued, the same areas glow again, while the portions of the reaction material next to them take a different course of the reaction. As a result, the final products do not conform to the requirements of compositions or powders for preparing high-performance ceramics with respect to particle size homogeneity (if sintering to give more compact units has not already taken place) or with respect to a homogeneous distribution of the elements. Furthermore, the process products do not turn out to be nitrate-free with certainty If, according to the fundamental teaching of U.S. Pat. No. 4,444,723, the starting materials are fairly large batches of mixed nitrate solutions, the comparatively slow evaporation of the mixed nitrate solution is bound to lead to partial separation of the components in the precipitate and to a mixed oxide product of accordingly inhomogeneous composition, due to the different solution properties of the individual metal nitrates. In the case of fairly large volumes of nitrate materials to be converted to the mixed oxide by means of microwaves, other factors causing separation are the different reaction temperatures and rates of decomposition which are site-dependent (on the surface and in the depth). In the case of partial sintering or even melting, further mixing and particle inhomogeneities occur.

It may also be mentioned that the reaction of solid metal nitrates encounters difficulties whenever the nitrate form is incapable of coupling with the incoming microwave irradiation at low temperatures, for example room temperature. An example of such a metal oxide is alumina. If nevertheless it is desired to decompose such a metal nitrate thermally by means of microwaves, the nitrate or mixed nitrate has to be heated to the coupling temperature either by means of a thermal energy source or a coupling agent (say glycerol, according to the teaching of German Offenlegungsschrift 36 11 141, or ammonium nitrate which decomposes without leaving a residue) has to be added. However, when starting from aqueous nitrate solutions, the situation where the metal nitrate or nitrate mixture to be reacted in the dry form by means of microwave irradiation has not yet reached the temperature of response for coupling with the microwaves can be avoided, except for a few cases. The reason for this is that water shows good coupling properties with microwaves, as a result of which an aqueous nitrate solution heats rapidly, the solvent can be readily evaporated and the metal nitrate obtained in crystalline form after evaporation of the solvent is present at temperatures of more than 100° C., at which temperature most metal nitrates show good interaction with the microwaves.

SUMMARY OF THE INVENTION

Compared with the prior art for preparing mixed oxide powders for ceramic compositions, in particular high-performance ceramic compositions, which is essentially limited to the mixed oxide process, and utilizing the decomposition technique of mixed metal nitrates to give mixed metal oxides, according to U.S. Pat. No. 4,444,723, which starts from dissolved metal nitrates, an object of the invention is to provide a universal process and apparatuses adapted thereto, by means of which metal oxide powders, but in particular mixed metal oxide powders, useful for high-performance ceramics having extremely homogeneous ratios of the particle size and distribution of the elements in the mixed oxide powder, can be obtained in an effective manner at low cost and for direct further processing to give the desired ceramic.

Starting with the essential features of the process according to U.S. Pat. No. 4,444,723, i.e. evaporation of the solvent of (mixed) nitrate solutions and thermal decomposition of the solid nitrate thus formed to give the oxidic form by means of microwaves, the object is achieved by a process for the preparation of pulverulent metal oxides for ceramic compositions from the corresponding metal nitrates dissolved in water or in dilute nitric acid, by evaporation of the solvent and thermal decomposition of the metal nitrate by means of microwaves, characterized in that metal nitrate solution is initially introduced into a reaction vessel such that when the solvent is evaporated by means of microwave irradiation until nitrous gases are formed and, while microwave irradiation is continued, further metal nitrate solution is added continuously onto the porous metal oxide containing sponge in a manner such that the solvent rapidly evaporates and the newly added metal nitrate is immediately converted to the metal oxide. The invention further provides an apparatus for continuous operation of the process, comprising a rotating reaction pipe running through a microwave resonator and made of a material permeable to microwaves and equipped with a feed inlet for the oxidic reaction product.

The invention is described below in more detail first in its general features and then by way of example.

A central idea of the invention is the concept that the disadvantages which must always be accepted when fairly large volumes of, in particular, mixed metal nitrate solutions are converted in a conventional manner into the oxidic metal oxides by means of microwaves, i.e. on the one hand the possible incomplete conversion of the nitrates into the oxides and on the other hand the appearance of oxidic products of inhomogeneous composition with respect to the distribution of the elements, can be avoided by starting the reaction not with the entire batch but using the (mixed) nitrate solution to be converted continuously in small portions so that the solvent portion of the solution added per time unit is rapidly evaporated and the solid metal nitrate which in each case is formed in small amounts per time unit is decomposed to give the metal oxide in a rapid reaction. If the reaction proceeds in the manner described, separation processes as a result of different metal nitrate solubilities during the, as it were, spontaneous evaporation of the starting solution and further inhomogenizing effects during the thermal decomposition of the solid mixed nitrate to give the oxidic form are prevented. Since in the continuous "immediate conversion" of the nitrate solution to the corresponding oxide the fresh solution introduced into the reaction process essentially only reaches the surface of the previously formed metal oxide composition each time, the conversion of the nitrate to the oxide takes place virtually as a surface reaction (on the previously formed oxide composition) and therefore leads to the ensured complete conversion of the nitrate to the oxide An important feature is that in this quasi-continuous reaction control a partial sintering of the metal oxide composition by local, uncontrolled superheating, which may produce glowing, can be safely prevented.

If the reaction is carried out in such a manner that first a small amount of nitrate solution is initially introduced into a storage vessel, for example made of Duran ® glass, (Schott, Mainz, Germany) and this solution is evaporated to dryness by means of microwave irradiation, which results in a nitrate cake of temperatures of around 100° to 120° C., and irradiation is then continued until nitrous gases have been formed, the nitrate composition is converted in many cases readily into a finely porous oxide or nitrate/oxide sponge, which continues to form during the subsequent continuous addition of further nitrate solution and, at the end of addition of nitrate solution and its conversion, turns out to be a purely oxidic, nitrate-free product. The oxide sponge removed after cooling can be readily ground, for example in an agate mortar, to give a fine powder, which can be directly plasticized and compacted. In the case of mixed oxide powders prepared in this manner, the material turns out to be extremely homogeneous; the distribution of elements is completely uniform over the entire product (no variation of the element mixing ratios as a function, for example, of the depth of the sample removed from the reaction material), and the oxide or mixed oxide crystallites obtained regularly have particle sizes in the range from 1 to 10 $\mu$m. However, if any solid bridges have been formed between the particles of the final product, they can be destroyed by crushing, if desired by gently grinding, the process product.

The sponge-like porous consistency of the product formed has an excellent effect of the conversion of further starting material on the sponge substance. If this desired porous, sponge-like consistency of the metal oxide formed should not form or should form incompletely with certain metal nitrates, the addition of an organic acid soluble in the starting nitrate solution and precipitating in the form of crystals upon evaporation of the solvent, for example tartaric acid, ensures that the oxidic process product formed is porous and sponge-like. Furthermore, such an addition has an accelerating effect on the conversion. Preferably, the organic acid is added in an amount of 1–30% b.w., more preferably, 5–10% b.w., of the total solution.

The favorable effect mentioned of the metal oxide sponge on the further conversion of metal nitrate solution to the metal oxide is based on a thermal effect and probably also on a surface effect of the porous, sponge-like product composition.

The thermal effect can be explained by the fact that the freshly added nitrate solution, aided by the heat release of the solid material, can evaporate on the heated sponge mass almost spontaneously—which would not be possible to achieve by pure addition of microwave energy—and that the solid nitrate formed in the meantime is immediately present at a temperature which, in the usual case, is above the minimum coupling temperature with the microwaves. The high overall rate of conversion also explains the uniformity and especially the small particle size of the crystallites of the oxidic process product.

The process of the invention makes it possible, in a very simple manner, to control the process procedure without interruption or change in energy of the microwave field acting on the reaction mass by controlling the adjustment and stabilization of the substance temperatures in the reaction vessel via the feed stream of fresh metal nitrate solution. A balanced metering in of the fresh solution also avoids glowing of the reaction or product composition. Furthermore, it was found that the risk of glowing of the microwave-irradiated substance after formation of the sponge-like product is very small anyway, probably because the microwave energy absorbed over the very large surface of the sponge substance is easily removed by thermal irradiation or convection. The selection of microwave radiation is such that the frequency, wattage, and time is sufficient to decompose the bulk of the nitrate to oxide. The determination thereof may be made with routine experimentation. Conventional microwave equipment is sufficient to effect the process.

In the reaction in the reaction flask using microwaves of 2.45 GHz and an output of the microwave generator of 1000 watt, it is, for example, possible to convert 1000 g of mixed oxide powder to the desired sponge-like end product within about 30 to 90 minutes in the following manner: about 100 ml of nitrate solution are initially introduced into the flask and irradiated with microwaves over a period of 5 to 20 minutes until nitrous gases are formed and the resulting solid composition has a sponge-like consistency; while maintaining the microwave irradiation, the remaining supply of nitrate solution is then run in in such an amount that the solvent always evaporates in a few seconds. The temperature of the dry mass formed is here in the range from 100° to 500° C. and can be controlled, as mentioned, by the flow intensity of the feed solution. The nitrous gases formed in the reaction can be trapped or sucked off and, if desired, neutralized by generally known measures.

However, the reaction also works if smaller amounts of nitrate solution are initially introduced or, with the microwave field in place, only a higher first feed dose of nitrate solution are initially introduced or, with the microwave field in place, only a higher first feed dose of nitrate solution is chosen. One of ordinary skill in the art can determine operating parameters with only routine experimentation, as the specific amounts of starting materials are not critical within a wide range, and the starting solution concentration affects the time taken to produce the sponge but not the ability to do so.

Instead of carrying out the process according to the invention in a quasi batchwise/continuous process in the storage vessel, it can also be carried out continuously by designing the reaction space in the manner of a rotary kiln and adding the nitrate solution at one end thereof and removing the reaction product (metal oxide or mixed metal oxide) at the other end thereof. In this design, the reaction tube can be made of Duran or quartz glass and is disposed in a microwave resonator space which in turn is surrounded by a radiation-shielding casing.

The preparation of the metal oxides in a rotary tube may be conducted in the presence of grinding bodies, thereby advantageously combining the process with a continuous gentle grinding process for immediate pulverization of the metal oxide sponge formed otherwise and for destroying any solid bridges formed in the reaction product, in which the grinding bodies furthermore have an energy-transferring function analogous to that of the metal oxide sponge. These grinding bodies, preferably in spherical form, can be, for example, alumina, which, although having poor coupling properties with microwaves, is heated to the general reaction temperatures in the course of the thermal decomposition of the metal nitrate or the mixed metal nitrate. On the other hand, in order to accelerate the evaporation and conversion processes, it is also possible to use grinding bodies consisting of a material which readily couples with microwaves even at low temperatures, and thus heats due to the interaction with the incoming radiation. An example of such a material is silicon carbide. This results in the practical advantage of using alumina grinding bodies for nitrates which have good coupling properties and of silicon carbide grinding bodies for nitrates which have poor coupling properties.

The technical idea of using grinding bodies made of a material which itself either has good coupling properties with microwaves and is heated in the process or which has no to poor coupling properties with microwaves and is not substantially heated directly by the incoming energy can be put to use to particular further advantage by initially introducing into the rotating tube a reaction bed comprising a mixture of grinding bodies of good coupling properties and grinding bodies of poor coupling properties. The obtainable technical effect is that, depending on the coupling properties of the different materials of the grinding bodies, the mixing ratio of the materials of the grinding bodies and the incoming microwave energy density, the reaction bed can be brought to a predeterminable starting temperature level before the beginning of the reaction by irradiation, after which the nitrate solution to be converted is then added continuously. Moreover, in the case of a weight ratio of grinding body mixture and reaction material matched to one another a temperature level of the mixture comprising reaction bed and product formed can be set to a predeterminable value, i.e. the general reaction temperature can be adjusted and ,kept constant with particular ease during the course of the reaction, in particular after the equilibrium between starting nitrate solution fed in and oxidic reaction product discharged has been reached. This excellently ensures an optimal temperature control matched to the particular starting solution of the metal nitrate or mixed metal nitrate. Instead of mixing the reaction bed comprising the grinding bodies which themselves either consist of material having good or poor coupling properties with microwaves (for example silicon carbide grinding bodies and alumina grinding bodies), it is also possible to use grinding bodies which themselves already comprise a mixture of materials having good and poor coupling properties. The use of grinding bodies of uniform (coupling or non-coupling) composition is preferable in those cases where it is of interest to readjust the temperature level of the reaction bed mixture in a convenient manner via the mixing ratio of the grinding bodies having good and poor coupling properties with microwaves, which can be effected by additionally metering in grinding bodies of the suitable thermally active species to the reaction bed mixture or by removing in grinding bodies of the other species having an opposite thermal effect from the reaction bed mixture. If the various materials of the grinding body can already easily be distinguished optically, the reaction bed mixture can be separated manually without much trouble; a separation can furthermore be carried out quickly by screening, if grinding body species of different specific diameters are present.

DESCRIPTION OF THE DRAWINGS

The invention is described in more detail below by way of exemplary embodiments, for which .first one example each for a reaction set-up for carrying out the process in a storage vessel and for carrying it out in a reaction rotating tube are presented in one schematic drawing each.

DETAILED DESCRIPTION

Figure 1:
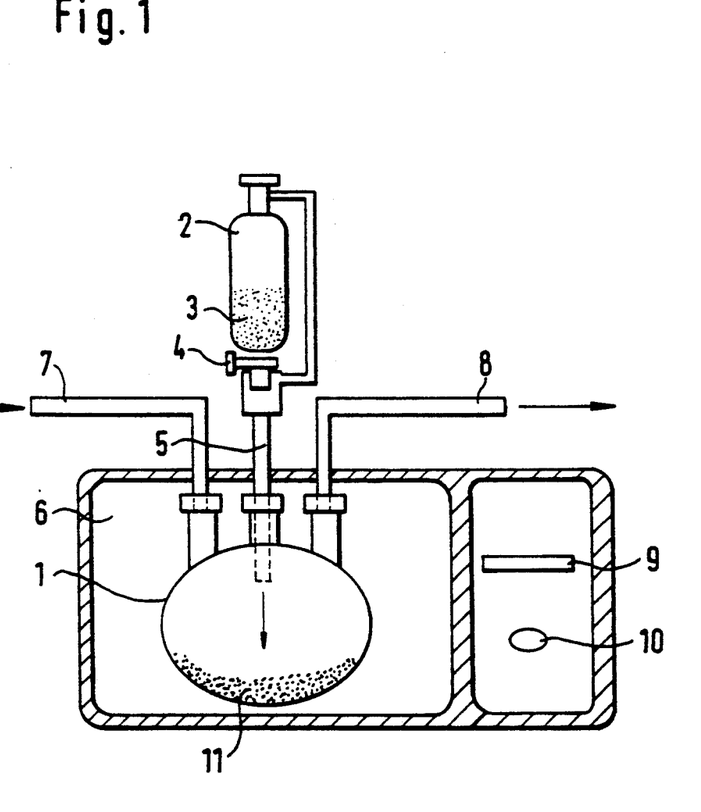
FIG. 1 shows a microwave reaction plant for preparing oxidic powders from aqueous nitrate solutions in a quasi batchwise/continuous process and FIG. 2 shows a microwave rotary kiln for preparing oxidic powders from aqueous nitrate solutions in a continuous process.

The apparatus according to FIG. 1 includes three-neck flask 1 as a reaction vessel connected to a storage vessel 2 for a metal nitrate solution 3 to be converted in the reaction vessel. The nitrate solution 3 is added to the reaction vessel 1 through a feed inlet 5 in a meterable feed stream via a control valve 4. In a modified arrangement (not shown), the nitrate solution 3 can also be injected or sprayed into the reaction vessel 1. The reaction vessel 1 is enclosed in a chamber 6 of a microwave resonator. Through the upper shielding of the chamber 6, the feed inlet 5, a purge gas feedline 7 and a gas discharge line 8 (if appropriate connected to a downstream suction pump—not shown) pass and are connected to the necks of the three-neck flask 1. The output of the microwave generator (not shown) and its operating time is adjusted by means of adjusting devices 9 and 10. Reference numeral 11 designates the oxidic reaction product.

Figure 2:
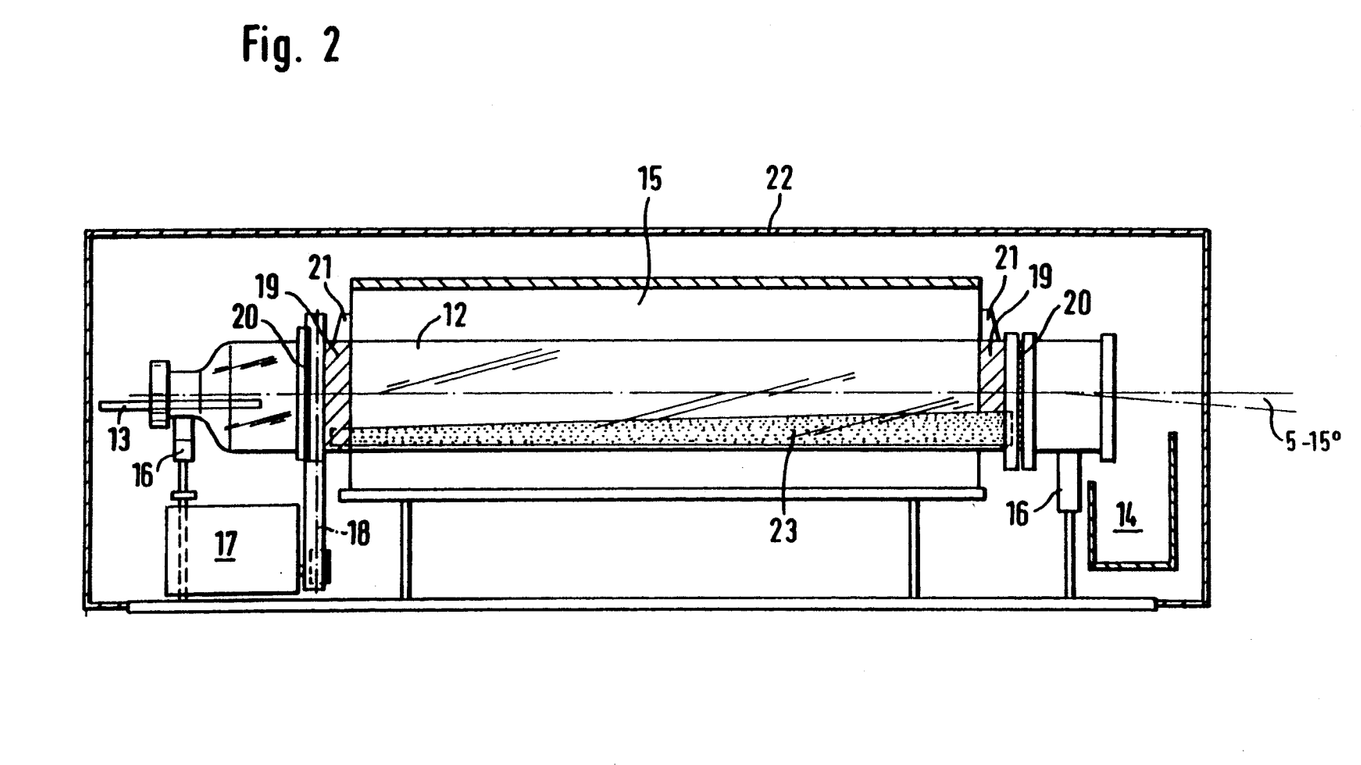

The apparatus according to FIG. 2, i.e. a microwave reaction plant for carrying out the process according to the invention continuously, comprises as an essential component a rotation reaction tube 12, which can be manufactured, for example, from Duran or quartz glass, into which a feed inlet device 13 for adding the nitrate or mixed nitrate solution 3 to be converted opens. At the opposite end of the tube 12, a discharge device 14 is positioned for discharging and collecting the oxidic process product. The reaction tube 12 runs through a microwave resonator 15, is supported at each end on a bearing 16 and can be made to rotate by means of a drive unit 17, the power transmission taking place, for example, by means of a driving belt 18. At least one of the bearings 16 is height-adjustable, in order to give the reaction tube 12 an adjustable inclination of, preferably 5° to 15°. For the shielding exterior from the microwave radiation in the embodiment shown in FIG. 2, lateral metal shields 19 are provided as well as grids 20 positioned outbound of the metal shields. The casing of the microwave resonator 15 and the metal shields 19 are arranged directly in front and behind the reactor tube being connected conductively by means of a sliding contact 21.

To completely shield the surroundings from microwave irradiation, it is recommended to surround the entire reaction set-up with radiation containing casing 22 which, of course, includes closable sides (not shown) to the reaction apparatus. As explained above, the reaction tube 12 can be charged with grinding bodies 23, which on the one hand maintain the oxidic reaction product formed in pulverulent form or condition it into a pulverulent form when the reaction tube 12 is rotated, and on the other hand, exert an energy-transmitting function analogously to that of the metal oxide sponge 11.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, cited above and below, and of corresponding German application P 40 34 786.9 are hereby incorporated by reference.

EXAMPLES

Example 1

Conversion of a Zn—Sb—Bi—Mn—Cr mixed nitrate to the mixed oxide with addition of tartaric acid (for preparing a varistor ceramic).

About 1000 g of varistor powder were prepared using an experimental set-up described under FIG. 1 at a microwave frequency of 2.45 GHz and a microwave output of 1000 watt in the following manner.

The starting solution contained the substances and amounts of substances listed below as an aqueous solution; the concentration of the solution was about 20% by weight, calculated as the oxide form of the dissolved substances:

| | |
|---|---|
| $Zn(NO_3)_2 \times 6H_2O$*) | 3158.3 g |
| $Sb_2O_3$ | 32.2 g |
| $Bi(NO_3)_3 \times 5H_2O$ | 160.9 g |
| $Mn(NO_3)_2 \times 4H_2O$ | 13.9 g |
| $Cr(NO_3)_3 \times 9H_2O$ | 44.3 g |
| $Co(NO_3)_2 \times 6H_2O$ | 48.3 g |

*)dissolved in a mixture of 125 g of tartaric acid and 250 ml of water.

First 100 ml of this solution were initially introduced into the reaction flask 1 and evaporated to dryness over a period of about 15 minutes with exposure to microwave radiation until nitrous gases formed. The temperature of the solid substance was about 300° C. The remaining solution was then added dropwise to the porous product sponge formed over a period of about 50 minutes in such a manner that the solvent immediately evaporated in each case and the sponge-like structure enlarged. 5 minutes after the addition of nitrate solution was complete, the microwave field was switched off, the cooled porous sponge material was then removed and crushed in an agate mortar. The fine powder obtained could be plasticized, compacted and sintered at 1200° C. for 90 minutes without problems to give a varistor ceramic.

The powder obtained substantially had a particle size of 2 μm (with deviations in the range from 0.5 to 5 μm) and the analytical (ACTUAL) composition listed in Table 1, which is followed by the theoretical (NOMINAL) composition according to the reaction batch:

| | ZnO | $Sb_2O_3$ | $Bi_2O_3$ | $MnO_2$ | $Cr_2O_3$ | $Co_3O_4$ |
|---|---|---|---|---|---|---|
| ACTUAL | 86.31 | 3.20 | 7.65 | 0.40 | 0.87 | 1.42 |
| NOMINAL | 86.39 | 3.22 | 7.73 | 0.43 | 0.88 | 1.33 |

Thermogravimetric analysis (TGA) showed that complete conversion to the oxides had taken place. The weight loss of the samples was about 1% by weight at 800° C. The weight loss took place continuously, starting at about 50° C. onwards, which indicates moisture adsorbed on the surface and does not indicate subsequent conversion of nitrate which may not have been converted completely to the oxide.

Chemical analysis of samples of the product which were taken from different areas (surface, center, depth) of the product sponge showed that within the experimental error of the analytical procedure all samples had the same composition of doping elements (Table 2).

| | Data in atom % | | | | |
|---|---|---|---|---|---|
| Sample number | Bi | Co | Cr | Mn | Sb |
| a | 0.42 | 0.49 | 0.43 | 0.37 | 0.86 |
| b | 0.42 | 0.44 | 0.40 | 0.37 | 0.84 |
| c | 0.37 | 0.44 | 0.41 | 0.37 | 0.81 |
| d | 0.40 | 0.43 | 0.41 | 0.37 | 0.83 |
| e | 0.43 | 0.46 | 0.39 | 0.37 | 0.81 |

Figure 3:
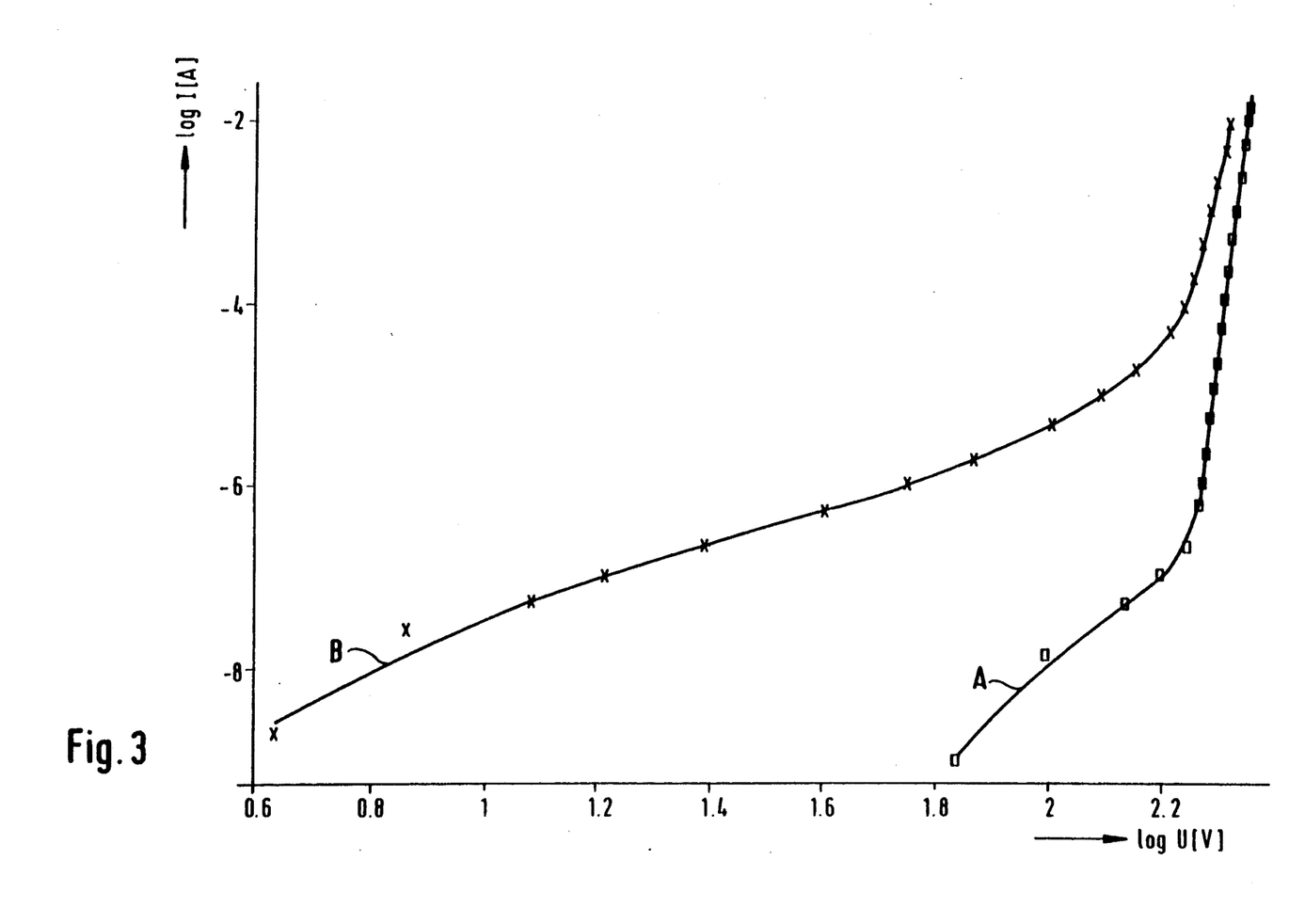
FIG. 3 is a graph which shows the performance of the varistor ceramic of the present invention compared with the performance of a conventional varistor ceramic.

The performances of the varistor ceramic produced are shown in FIG. 3 (curve A) in comparison with a conventional varistor ceramic produced from an oxide powder of the same composition obtained by the mixed oxide process (curve B).

As can be seen, the advantages of the varistor ceramic produced using a zinc oxide powder prepared according to the invention are the formation of a steeper and sharper bend of the varistor characteristic and the appearance of smaller leakage currents at the point of use, which only appear at a higher voltage. The higher varistor qualities compared with the prior art indicate that the zinc oxide varistors produced using mixed oxide powders according to the invention are distinguished by a higher concentration of active grain boundaries than the varistors obtainable from oxide powders obtained in a conventional manner. The material prepared according to the invention makes it possible to produce thinner varistors than those produced conventionally and to consume less material.

Example 2

Preparation of yttrium-stabilized zirconium dioxide powder

A nitric acid solution of zirconium oxycarbonate and yttrium oxide were reacted using an experimental set-up such as described in FIG. 1 at a microwave frequency of 2.45 GHz and a microwave output of 1000 watt, in which the composition of the starting solution was about 90 mol % of zirconium and about 10 mol % of yttrium and the concentration by weight, relative to the oxides, was that of a 20% solution.

First about 100 ml of this solution were initially introduced into the reaction flask 1 and heated in a microwave field until nitrous gases were formed. This resulted in the formation of a porous sponge material. Further starting solution was then metered in in such a manner that on the one hand the amount of solution added in each case was converted within seconds in the microwave field and on the other hand the temperature was maintained at a moderate level. The reaction product obtained, on the whole a porous sponge material, could be crushed in an agate mortar to give an extremely fine powder whose crystal sizes were between 0.5 and 2 μm. The composition of the product is shown in Table 3.

|  | Zirconium | Yttrium |
| --- | --- | --- |
| ACTUAL: | 90.34 | 9.70 |
| NOMINAL: | 90.23 | 9.77 |

Dilatometer tests showed that the product material starts sintering at a temperature as low as about 700° to 800° C. The most extensive sintering behavior was shown by this material in the range between 1150° and 1250° C. At a temperature of about 1500° C., sintering is complete This shows that an yttrium-stabilized zirconium dioxide prepared by the process according to the invention has a high sintering activity even at relatively low temperatures compared with conventionally prepared powders, which require sintering temperatures between 1700° and 1900° C.

Example 3

Preparation of yttrium-barium-copper oxide powder (for a superconducting material to be produced therefrom)

A 20% solution (calculated as oxide content) of Y(NO$_3$)$_2$, Ba(NO$_3$)$_2$ and Cu(NO$_3$)$_2$ which had a molar Y:Ba:Cu mixing ratio of 1:2:3 was reacted using an experimental set-up such as described under FIG. 1 at a microwave frequency of 2.45 GHz and a microwave output of 1000 watt.

In identical experimental batches, first amounts of 50 to 100 ml of solution were in each case initially introduced into the reaction flask 1 and evaporated to dryness by means of microwave irradiation. The reaction temperature here was about 400° C. After the formation of initial amounts of nitrous gases, which were sucked off, further solution was metered in until about 250 g of product had been obtained. After further irradiation with microwaves for about 15 minutes, a black yttrium-barium-copper oxide powder was removed, which did not have to be recalcined. The material could be easily crushed in a mortar to give a fine homogeneous powder.

The powder thus obtained was then compacted to give tablets and sintered. The superconducting property of this material could be detected by dipping the tablets into liquid nitrogen and making them float above a ring magnet. Accordingly, the assumption may be made that the critical temperature is above the temperature of liquid nitrogen.

Example 4

Preparation of a varistor powder in a continuous microwave reaction process in a rotating pipe A varistor powder was prepared in a reaction setup according to FIG. 2 comprising a rotating pipe 12 made of Duran glass of 500 mm in length and an internal diameter of about 80 mm at a microwave frequency of 2.45 GHz and a microwave output of 2×500 watt as follows:

500 to 700 ml of a starting solution prepared as in Example 1 were initially placed in the reaction pipe 12 whose rotational speed was between 15 and 30 min$^{-1}$ and had been charged with about 800 g of alumina grinding bodies (spheres), and concentrated with exposure to microwave irradiation until nitrous gases were formed. The temperature of the solid substance obtained was about 400° C. Further starting solution was then metered in continuously over a period of about 100 minutes in such a manner that the solvent immediately evaporated each time. The dry substance of the product increased, was obtained as a fine powder by virtue of the rotating movement of the reaction pipe 12 and the grinding bodies 23 and continuously discharged at the end of the reaction pipe 12. The purely oxidic pulverulent product obtained in this way predominantly had particle sizes in the range from 1 to 15 μm, even though finer particles were also present. The powder obtained was plasticised, compacted and sintered at 1150° C. without difficulties to give a varistor ceramic. The electrical values of the varistor ceramic were those of the varistor ceramic according to Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of pulverulent metal oxides for ceramic compositions, from the corresponding metal nitrates dissolved in water or in dilute nitric acid, comprising evaporation of the solvent and thermal decomposition of the metal nitrate by means of microwaves, the improvement wherein a quantity of metal nitrate solution is initially introduced into a reaction vessel such that when the solvent is evaporated by means of microwave irradiation until nitrous gases are formed, a porous sponge containing metal oxides is formed, and, while microwave irradiation is continued, further metal nitrate solution is added continuously onto the porous metal oxide containing sponge in a manner such that the solvent rapidly evaporates and the newly added metal nitrate is immediately converted to the metal oxide.

2. A process according to claim 1, wherein the reaction temperature is controlled by adjusting the amount of metal nitrate solution added per unit of time.

3. A process according to claim 1, wherein the nitrate solution contains a crystalline organic acid in a solvent.

4. A process according to claim 3, wherein the crystalline organic acid is tartaric acid.

5. A process according to claim 1, wherein the reaction is carried out in a rotating reaction pipe.

6. A process according to claim 5, wherein grinding bodies are present in the rotating pipe.

7. A process according to claim 6, wherein the grinding bodies comprise a material which absorbs microwaves and is thereby directly heated.

8. A process according to claim 6, wherein the grinding bodies comprise a material which does not absorb a significant amount of microwaves, and is not thereby directly heated.

9. A process according to claim 6, comprising using a mixture of grinding bodies of which some absorb and some do not absorb microwaves, whereby some are heated and some are not heated by the microwaves, in the form of a reaction bed having a predeterminable reaction temperature level.

10. A process according to claim 7, wherein silicon carbide is the material of the grinding bodies absorbing the microwaves and alumina is the material of the grinding bodies not absorbing microwaves.

* * * * *